(No Model.)
H. C. SARGENT.
HAME.
No. 318,036. Patented May 19, 1885.
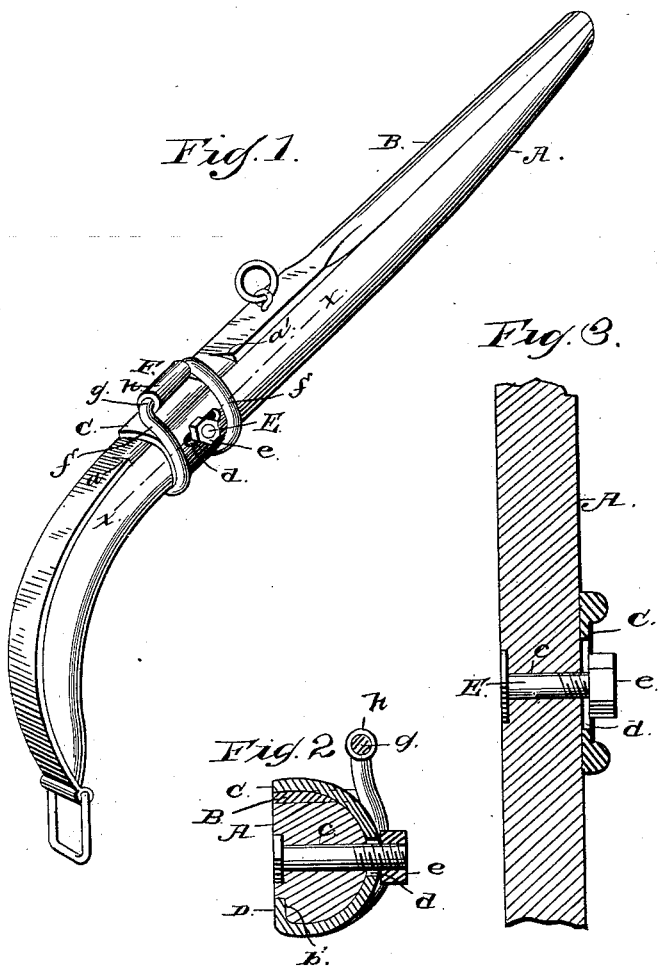
WITNESSES
M. J. Fowler
E. G. Siggers
INVENTOR
Henry C. Sargent
By his Attorneys
C. A. Snow & Co.

UNITED STATES PATENT OFFICE.

HENRY C. SARGENT, OF MACHIAS, MAINE.

HAME.

SPECIFICATION forming part of Letters Patent No. 318,036, dated May 19, 1885.

Application filed March 7, 1885. (No model.)

*To all whom it may concern:*

Be it known that I, HENRY C. SARGENT, a citizen of the United States, residing at Machias, in the county of Washington and State of Maine, have invented a new and useful Improvement in Hames, of which the following is a specification, reference being had to the accompanying drawings.

My invention relates to hames; and it has for its object to provide the same with an improved construction of plate for the attachment of the trace or stouter, which shall be simple in its construction, one that may be readily and easily applied, and will be strong and durable, and, further, to provide a clamp or plate which may be vertically adjusted, and which will not impair the strength of the hame.

With these ends in view the invention consists in the combination, with a hame, of a clamp or plate having a lip or flange for holding said plate or clamp upon the hame and preventing its detachment.

The invention further consists in the details of construction and combinations of parts hereinafter fully described, and pointed out in the claims.

In the drawings, Figure 1 is a perspective view of a hame-section, showing my improved clamp or plate attached thereto. Fig. 2 is a horizontal section of the same. Fig. 3 is a vertical section on the line x x of Fig. 1. Fig. 4 is a detail view of the clamp detached; and Fig. 5 is a perspective view of a modified form of clamp, showing the same detached.

In the accompanying drawings, in which like letters of reference indicate corresponding parts in all the figures, A represents one of the hame-sections, which is provided on one of its edges with a facing of metal, B, which is cut away, as shown, thus forming shoulders $a\ a'$.

C represents the clamp or plate, which is substantially semicircular in form. The said plate or clamp C is of metal, and fits upon the rounded face of the hame-section A. It will be seen that by recessing the edge of the facing-plate B a rounded edge or surface is presented to the clamp or plate C, thus allowing it to fit the said hame-section closely and preventing it from being worn by the edge of said plate. One of the ends of the clamp or plate C is turned inwardly at right angles to its body, and fits a recess, $b$, in the hame-section, formed for its reception, thus presenting a smooth surface.

The lip or flange D, formed by bending or turning one of the ends of the plate or clamp C inwardly, serves to hold said plate upon the hame-section and prevents its detachment.

The hame-section A is formed with a passage or opening, $c$, countersunk at one end, and in said opening is located a bolt, E, the rectangular headed end of which is seated in the countersunk end of said opening, while its threaded end extends through the hame and an elongated slot or opening, $d$, formed in the plate or clamp C, and adapted to engage said threaded end of the bolt is a nut, $e$. By loosening said nut the plate or clamp C may be moved vertically and clamped at any desired adjustment by tightening the nut.

Formed integral with the plate or clamp C is a loop, F, which consists of the two short arms $f$, connected at their outer ends by a bar, $g$, upon which is a sleeve or bushing, $h$, said loop being adapted to receive the trace, which is designed to be attached thereto.

In the modification shown in Fig. 5 the loop is formed by providing two outwardly-extending ears or lugs, which are formed with holes or openings, and connecting said ears or lugs is a bolt, G.

In lieu of the oblong slot or opening I employ a series of perforations or openings, and when it is desired to adjust the clamp vertically the bolt E is removed from engagement with one of the openings and the clamp moved to the desired point. The bolt E is then passed through a hole or opening on a line therewith, and the nut placed upon the end of the same and tightened, thus holding the clamp against movement.

Having fully described my invention, what I claim as new, and desire to secure by Letters Patent, is—

1. The combination, with a hame-section having a recess, and a facing of metal fitted therein, of a plate having an inwardly-extending lip, D, fitting a recess, $b$, in the hame, a loop, and means, substantially as described, whereby the plate may be vertically adjusted.

2. The combination, with a hame-section, of a plate carrying a loop and having an inwardly-extending lip, D, a bolt, E, fitted in a passage in said section, and having its head located in a countersunk opening, said bolt engaging the plate C, and a nut to engage said bolt, as set forth.

3. The combination, with a hame-section, of a plate or clamp having an inwardly-extending lip or flange, and an elongated slot, and a bolt and nut, substantially as set forth.

In testimony that I claim the foregoing as my own I have hereto affixed my signature in presence of two witnesses.

HENRY C. SARGENT.

Witnesses:
G. LONGFELLOW,
STEPHEN LONGFELLOW.